June 3, 1930.  L. M. SPENCER  1,761,941
UNDERSLUNG TIRE CARRIER
Filed Oct. 26, 1927
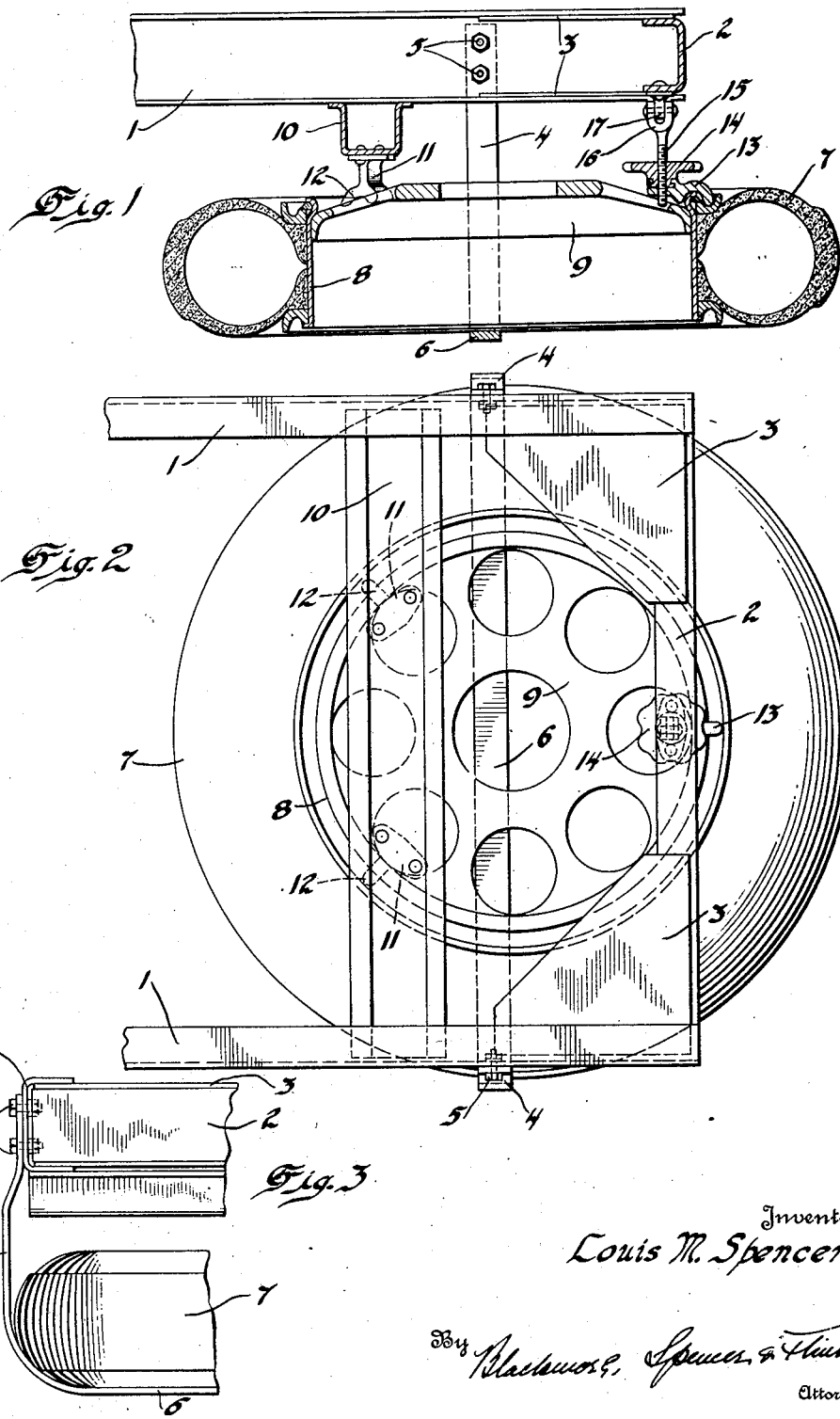
Inventor
Louis M. Spencer Patented June 3, 1930

1,761,941

UNITED STATES PATENT OFFICE

LOUIS M. SPENCER, OF DETROIT, MICHIGAN, ASSIGNOR TO GENERAL MOTORS CORPORATION, OF DETROIT, MICHIGAN, A CORPORATION OF DELAWARE

UNDERSLUNG TIRE CARRIER

Application filed October 26, 1927. Serial No. 228,829.

This invention relates to motor vehicles, and more particularly to spare tire carriers, for use with vehicles wherein the chassis frame extends for a short distance beyond the rear axle, leaving ample clearance above the ground for the convenient mounting of an extra tire under the frame.

One of the primary objects of the invention is to provide an improved tire carrier of simplified construction, involving the use of a few sturdy parts, which will be economical in production and which may be readily applied to existing vehicles or employed as regular factory equipment, without necessitating change in chassis frame design.

A further object of the invention is to provide a carrier which will securely hold a spare tire against displacement and permit the tire to be mounted or removed, without requiring the use of tools and upon a single adjustment, with utmost ease and a minimum expenditure of manual effort.

A further object of the invention is to provide a device by which the tire will be carried sufficiently high above the ground, as to leave ample road clearance to avoid damage to the tire by obstacles in the road.

Other incidental objects and advantages will be apparent from the following specification, taken with the accompanying drawing, in which Fig. 1 is a vertical sectional view of the rear portion of a chassis frame with a tire suspended thereunder in accordance with the present invention;

Fig. 2 is a top plan view and

Fig. 3 is a fragmentary rear elevation of the structure shown in Fig. 1.

Referring to the preferred embodiment of the invention as illustrated in the drawing, the characters 1—1 indicate a pair of longitudinal channel-shaped members or side sills of the vehicle chassis frame and 2 is a transverse cross member connecting the ends of the side members, the members being braced with each other at the corners by reinforcement plates 3—3. Suspended below the chassis frame is a U-shaped bar or strap having its upwardly projecting side arms 4—4 securely fastened, as by rivets or bolts 5, to the chassis side members 1—1, and its bottom cross portion 6 spaced from and extending transversely beneath the frame, to form a rest for supporting the weight of a tire placed thereon in a substantially horizontal position. In the drawing, there is shown a tire casing 7 carried by a rim 8 on the disc wheel 9, illustrating the use of the carrier on vehicles equipped with demountable disc wheels. It is to be understood, however, that the carrier may be employed to mount the spare tire rim alone, or a rim carrying a solid or a pneumatic tire, either inflated or deflated. Located forwardly of the U-shaped supporting strap and carried on the under side of the frame by the transverse member 10, are a pair of dependent tire engaging brackets 11—11, each having a curved foot 12 at its lower end to provide a seat on the undersurface of the bracket, in which the top side of horizontally disposed tire rim is engageable. To the rear of the supporting strap, and also engageable with the upper side of the tire rim is a lug 13 carried by an adjustable hand wheel or ring nut 14, screw threaded on the stem 15, the bifurcated head 16 of which is pivoted for sidewise swinging movement to a bracket ear 17, fixedly secured to the bottom flange of the cross member at the center thereof. Adjustment of the hand wheel on the screw threaded stem effects a downward clamping pressure on the tire rim to rock the tire on the bottom strap 6 into firm engagement with the brackets 11, which are so positioned on the member 10 as to engage portions of the rim spaced approximately ninety degrees apart, and thus locate the tire in proper position on the strap and thereafter hold it against shifting movement.

The relation of the parts is such that the cross portion 6 of the weight supporting strap engages the under side of the tire just forward its center of gravity. It will be apparent, therefore, that the weight of that portion of the tire to the rear of the strap will exceed that forward the supporting strap and the tire will have a natural tendency under gravity pull to tip or rock on the strap into engagement with the brackets 11. As a result, the mounting or removal of a tire is a simple and easy task. The mounting may be effected by rolling the tire to the rear of the vehicle and allowing it to rest against the rear edge of the strap 6, after which the bottom can be lifted and the tire shoved or slid forward on the strap, until the rim can be seated against the under side of the brackets 11, when the weight of the tire to the rear of the strap will maintain the tire in such position. Thereafter it is only necessary to adjust the hand wheel to effect a downward clamping pressure on the tire and securely hold it against displacement. Obviously the reversal of the procedure permits removal of the tire.

While the above description has been more or less specific as to structure, it is to be understood that the invention is not limited to exact details and that such modifications may be made as come within the scope of appended claims.

I claim:

1. The combination with a chassis frame, of means to carry a spare tire in substantially horizontal position beneath the frame, including a tire supporting strap suspended from the frame and engageable with the underside of the tire, and tire engaging members associated with the underside of the frame on either side of said strap for engagement with the upper side of the tire, one of said members being adjustable to effect a clamping action on the tire for firmly maintaining it in position.

2. The combination with a chassis frame, of means to carry a spare tire rim in substantially horizontal position beneath the frame, including a U-shaped supporting strap suspended from the frame, a locating member on the frame spaced forwardly of said strap for engagement with the upper portion of said rim and an adjustable lug carried by the frame rearwardly of said strap for engagement with the upper portion of said rim to firmly hold the rim in position.

3. The combination with a chassis frame, of means to carry a spare tire in substantially horizontal position beneath the frame, including a supporting member secured to the frame adapted to have a tire rested thereon and to support the tire on a line forming a fulcrum axis spaced from the center of gravity of the tire, and tire engaging means associated with the frame, for engagement with the upper side of the tire to form a stop against the tendency of the tire to tip on said supporting member, under influence of gravity and adjustable means to firmly hold the tire in engagement with said tire engaging means.

4. The combination with a chassis frame, of means to carry a spare tire in substantially horizontal position beneath the frame, including a U-shaped strap suspended by and extending below the frame, and being adapted to support the tire forward of its center of gravity, a locating member carried by the frame forwardly of said strap and against which the upper side of the tire engages by reason of its tendency to tip on said strap under gravity influence and means to exert downward clamping pressure on the top side of the tire to the rear of said strap for fixedly holding the tire in position.

5. The combination with a chassis frame, of means to carry a spare tire in substantially horizontal position beneath said frame, including a fixed tire engaging member on the underside of the frame adapted for engagement with the upper side of the tire and a supporting member suspended from the frame upon which the tire rests, the relation of the parts being such that the weight of the tire to one side of the support is greater than that on the other, whereby the lighter side tends to tip upward into abutment with said fixed member.

6. A spare tire carrier for carrying a tire in a substantially horizontal position, including an immovable tire supporting member engageable with the under side of the tire, an immovable locating element engageable with the upper side of the tire and located to one side of the supporting member, and a movable element engageable with the upper side of the tire and located to the opposite side of the supporting member and adapted by its movement to rock the tire on the supporting member and into or out of firm engagement with the said immovable locating element.

7. Means to carry a spare tire in a substantially horizontal position including tire engaging members, one of which is engageable with the under side of the tire to form a rocking abutment therefor and the others of which are engageable with the opposite side of the tire at points forward and rearward of the first mentioned member to locate the tire in a pre-determined definite position, one of the members being adjustable and adapted by its adjustment to rock the tire about its rocking abutment into or out of firm engagement with the other members.

8. Means to carry a spare tire in a substantially horizontal position including a tire engaging member adapted for engagement with one side of the tire and to form a fulcruming abutment therefor, and a pair of tire engaging members for abutment with the opposite side of the tire and at spaced-apart points located forward and rearward of the fulcruming abutment, and means to move one of the last mentioned members into contact with the tire to rock the tire about its fulcruming abutment and into firm contact with the other of said last mentioned members.

9. Means to carry a spare tire in a substantially horizontal position beneath the chassis frame of a motor vehicle, including a U-shaped tire supporting strap suspended from the frame in spaced relation therewith and adapted for engagement with the under side of a tire inserted in the space between the tire and the frame, locating members associated with the under side of the frame for engagement with the upper side of the tire on either side of the supporting member, and means to move one of said members relative to the others to hold the tire in firm engagement with each member.

In testimony whereof I affix my signature.

LOUIS M. SPENCER.